United States Patent [19]

Hanser

[11] Patent Number: 4,743,037
[45] Date of Patent: * May 10, 1988

[54] AUTOMATIC LEVELLING SYSTEM

[75] Inventor: Paul. E. Hanser, Wilton, Iowa

[73] Assignee: HWH Corporation, Moscow, Iowa

[*] Notice: The portion of the term of this patent subsequent to Jul. 1, 2003 has been disclaimed.

[21] Appl. No.: 826,364

[22] Filed: Feb. 5, 1986

Related U.S. Application Data

[63] Continuation-in-part of Ser. No. 605,802, May 1, 1984, Pat. No. 4,597,584.

[51] Int. Cl.⁴ .............................................. B60S 9/00
[52] U.S. Cl. ................................. 208/6 R; 180/41; 251/282; 251/903; 254/423; 261/DIG. 38; 208/DIG. 1
[58] Field of Search ......... 280/6 R, 6 H, 6.1, DIG. 1, 280/707; 180/41; 254/45, 418, 423, 424, 425; 251/281, 282, 903; 261/DIG. 38

[56] References Cited

U.S. PATENT DOCUMENTS

| | | | |
|---|---|---|---|
| 3,817,493 | 6/1974 | Hanser | 254/423 |
| 4,061,309 | 12/1977 | Hanser | 254/423 |
| 4,084,830 | 4/1978 | Daniel, Jr. et al. | 280/707 |
| 4,165,861 | 8/1979 | Hanser | 254/423 |

Primary Examiner—John J. Love
Assistant Examiner—Kenneth R. Rice
Attorney, Agent, or Firm—Ellsworth R. Roston; Charles H. Schwartz

[57] ABSTRACT

A system for automatically levelling a vehicle, such as a recreational vehicle, relative to gravity includes a plurality of extensible jacks, preferably hydraulic, disposed at strategic positions on the vehicle underside. Switches sense the downward tilting of the vehicle relative to gravity at the strategic positions and produce signals to operate the jacks in accordance with such tilting. Before the jacks are extended, air bags in the vehicle are deflated. When the hydraulic pressure in a hydraulic circuit exceeds a first value, the jacks are extended in a particular sequence depending upon the particular directions in which the vehicle is tilted relative to gravity. A delay is preferably provided between the operations of each jack and the next jack in the sequence to eliminate transients in the next jack operation. When the vehicle has been levelled, jacks not previously extended are extended until they engage the ground with a second pressure less than the first pressure. Such jacks are extended by opening bleeder valves associated with such jacks and maintaining a relief valve closed. The pressure in such jacks is limited to the second particular pressure after such extension by closing the bleeder valve at such reduced pressure while opening the relief valve. While the vehicle is travelling, the hydraulic fluid in the jacks is slowly bled to a reservoir by opening the bleeder valves and the relief valve. In this way, hydraulic forces cannot accumulate in the jacks to the first particular pressure to operate the jacks.

30 Claims, 9 Drawing Sheets

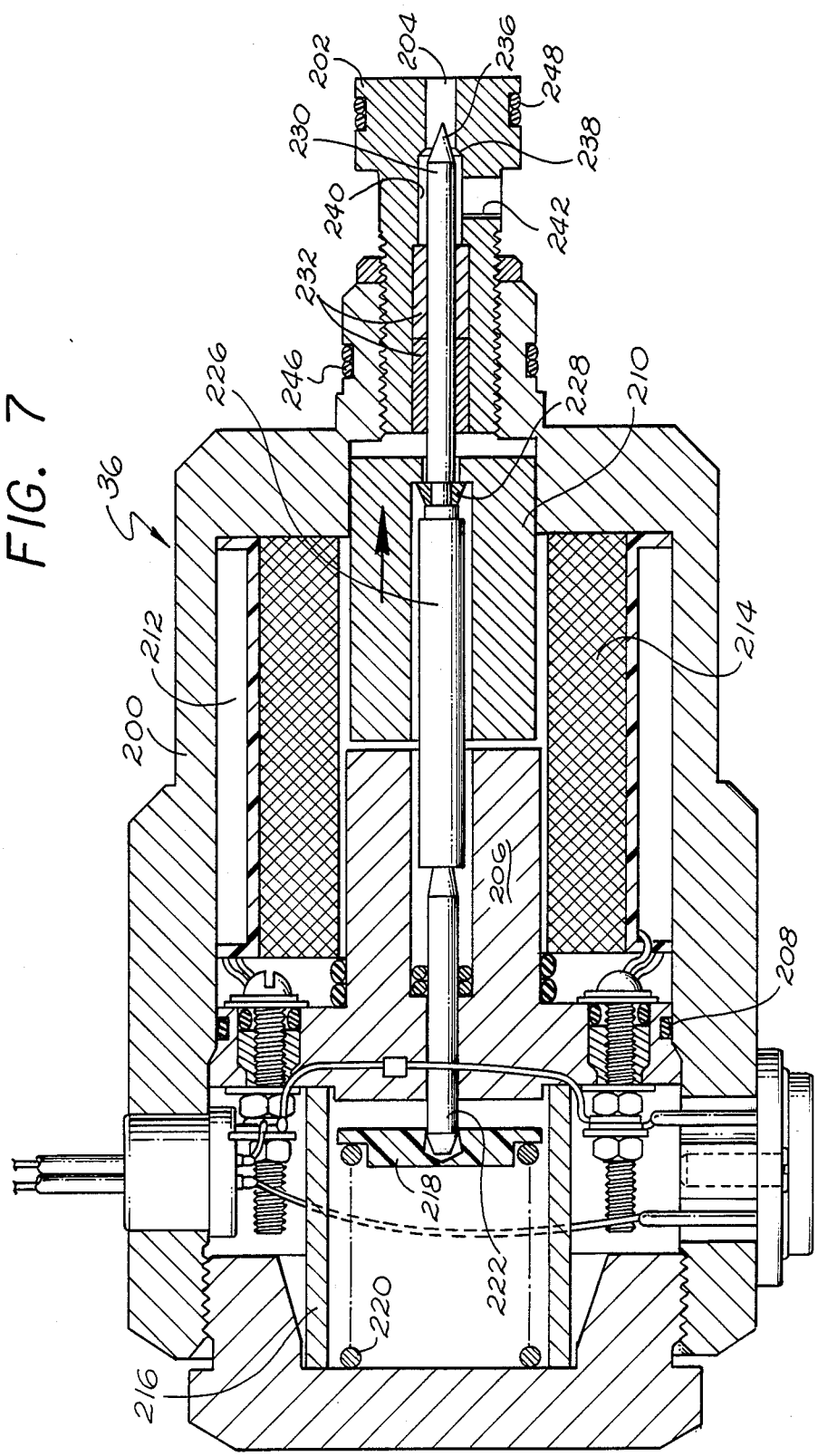

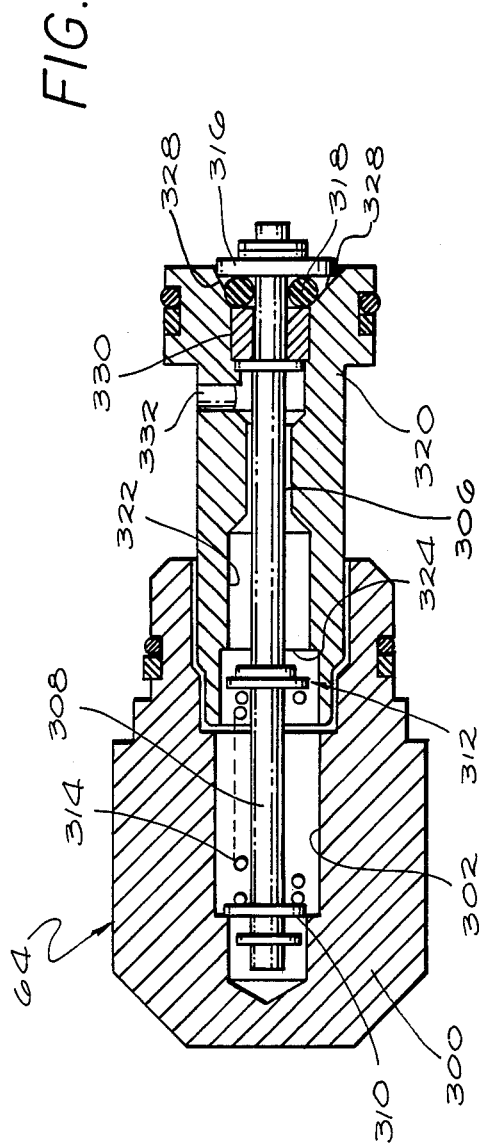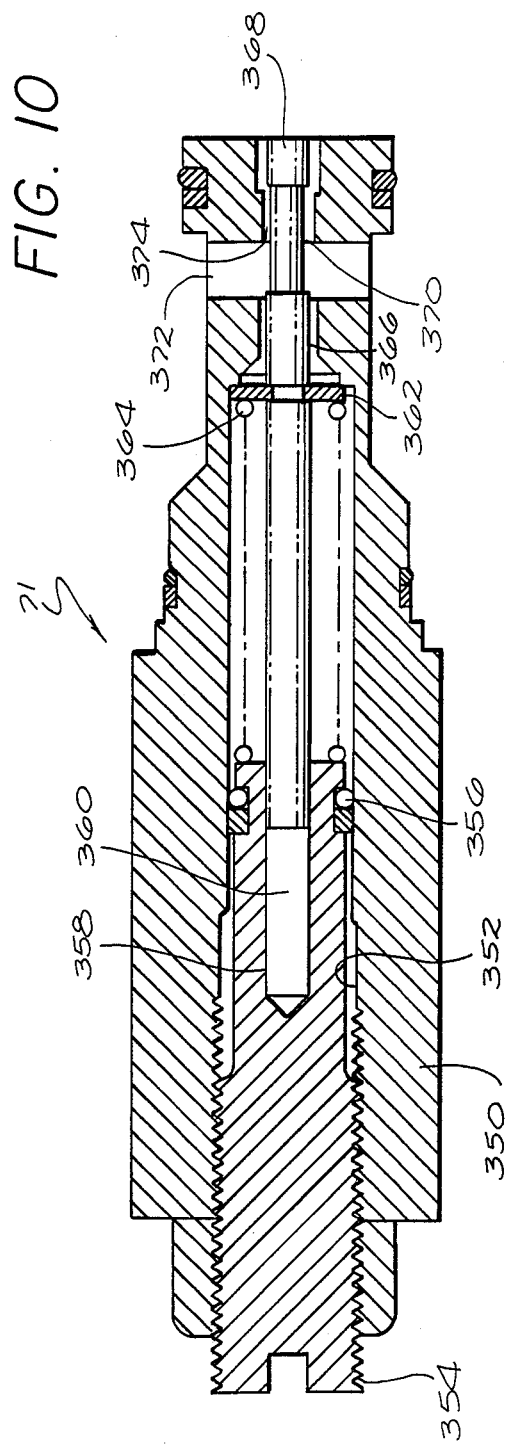

AUTOMATIC LEVELLING SYSTEM

This is a continuation-in-part application of application Ser. No. 605,802 (now U.S. Pat. No. 4,597,584) filed by me on May 1, 1984, for "Automatic Levelling System" and assigned of record to the assignee of record of this application.

This invention relates to systems for levelling vehicles, such as recreational vehicles, relative to gravity and more particularly to systems for automatically levelling such vehicles. The invention is particularly adapted to be used in vehicles which employ hydraulic jacks to level the vehicles relative to gravity. The invention is especially adapted to extend, to a particular pressure on the ground, any jacks not extended in levelling the vehicle, to maintain such jacks at such particular pressure after such extensions and to prevent any pressure from accumulating in the jacks while the vehicle is travelling.

Recreational vehicles are now in widespread use to provide families and individuals with vacation opportunities at relatively low cost. The recreational vehicles allow families and individuals to visit out-of-the-way locations of great scenic beauty and to enjoy the scenic beauty of these locations at relatively low cost. The vehicles also provide such families and individuals with the opportunity to hunt, fish, hike and engage in a number of outdoor sports while being assured of adequate accommodations and even of home cooking.

In many locations, the vehicles have to be parked at sites which are not level relative to gravity. This results from the fact that the available camp sites are often located in rugged terrain. However, in order to obtain optimal benefits from such sites, the recreational vehicles should preferably be level relative to gravity. For example, when the vehicle is level relative to gravity, dishes on tables are stable and people sleeping in beds can adopt and maintain comfortable positions.

Since recreational vehicles are often parked at decidedly non-level sites, jacks have been provided to adjust the disposition of the vehicle so as to make the vehicle level relative to gravity. These jacks may be either hydraulically or electrically operated. The jacks are generally disposed at the corners of the recreational vehicle and are attached to the vehicle at the underside of the vehicle. The jacks are individually operated to adjust the level of the vehicle relative to gravity. As will be appreciated, the individual operation of the jacks is time-consuming and not always precise. This can be especially disturbing to a family which arrives, tired and hungry, at a campsite in the evening and which then has to level the vehicle relative to gravity before the evening meal can be prepared and served and before the family can start to relax for the evening.

Since the recreational vehicle industry is relatively large, a considerable effort has been made, and substantial sums of money have been expended, to overcome the problems discussed in the previous paragraph. Some progress has actually been made. For example, the jacks in use have been improved through the years so that their performance is more reliable than the performance of the jacks manufactured and sold a few years ago. In spite of such progress, however, major problems still remain. The jacks still have to be individually operated, with no assurance that levelling of the vehicle relative to gravity can be accomplished in any reasonable period of time.

Co-pending application Ser. No. 605,802 by me on May 1, 1984, for an "Automatic Levelling System" discloses and claims a system for automatically levelling a vehicle relative to gravity. The system includes a plurality of extensible jacks, preferably hydraulic, disposed at strategic positions at the bottom of the vehicle. A plurality of switches sense the downward tilting of the vehicle relative to gravity at the strategic positions and produce signals to operate the jacks in accordance with such tilting. The jacks are extended in a particular sequence depending upon the particular directions in which the vehicle is tilted relative to gravity.

The jacks become extended only when the hydraulic pressure in a hydraulic circuit exceeds a first particular value. The jacks tilted the greatest relative to gravity are initially extended. Since the rear of the vehicle weighs considerably more than the front, the switches are constructed and are connected in a circuit to resolve any ambiguities in favor of initially operating the jacks at the rear of the vehicle. A delay is preferably provided between the operation of each jack and the operation of the next jack in the sequence so that transients in the movement of the vehicle from the operation of each jack can be eliminated before the next jack is operated.

When the vehicle has been levelled relative to gravity, any jacks still not previously extended to level the vehicle are extended until they engage the ground with a second particular pressure less than the first particular pressure. When the hydraulic forces in the jacks are less than the first particular pressure and the vehicle is travelling between destinations, the hydraulic fluid in the jacks is slowly bled to a reservoir so that hydraulic forces cannot accumulate in the jacks above the first particular pressure to operate the jacks.

This application discloses and claims a system which provides improvements over the system disclosed and claimed in co-pending application, Ser. No. 605,802. The system includes bleeders valve and a relief valve connected in hydraulic circuitry with the jacks for assuring that the jacks not previously extended in levelling the vehicle are extended to engage the ground with a second particular pressure less than the first particular pressures. The hydraulic circuitry including the bleeder valves and the relief valve also assures that the jacks will be maintained at the second particular pressure after such extension. The hydraulic circuitry including the bleeder valves and the relief valve also operates to assure that fluid will not accumulate in the jacks while the vehicle is travelling.

In one embodiment of the invention, a system for automatically levelling a vehicle, such as a recreational vehicle, relative to gravity includes a plurality of extensible jacks, preferably hydraulic, disposed at strategic positions on the vehicle underside. Switches sense the downward tilting of the vehicle relative to gravity at the strategic positions and produce signals to operate the jacks in accordance with such tilting.

Before the jacks are extended, air bags in the vehicle are deflated. The jacks are then extended in a particular sequence depending upon the particular directions in which the vehicle is tilted relative to gravity. These extensions occur only when the hydraulic pressure in a hydraulic circuit exceeds a first particular value. A delay is preferably provided between the operation of each jack and the operation of the next jack in the sequence to eliminate transients in the operation of the next jack.

When the vehicle has been leveled, jacks not previously extended in levelling the vehicle are extended until they engage the ground with a second particular pressure less than the first particular pressure. While the vehicle is travelling, the hydraulic fluid in the jacks is slowly bled to a reservoir so that hydraulic forces cannot accumulate in the jacks to the first particular pressure to operate the jacks. This slow bleeding is obtained by opening the bleeder valves and the relief valve.

The extension of such jacks is provided by opening bleeder valves associated with such jacks and maintaining a relief valve closed. The limitation of the pressure in such jacks to the second particular pressure after such extension is obtained by closing the bleeder valves at such second particular pressure while opening the relief valve.

In the drawings:

FIG. 1 is a schematic perspective view of the underside of a recreational vehicle and of jacks disposed at strategic terminals at the underside of the vehicle to level the vehicle;

FIG. 2 schematically shows a hydraulic system for automatically levelling a recreational vehicle;

FIG. 7 is a sectional view of a hydraulic valve assembly which is included in the hydraulic circuitry of FIG. 2 and which is operative by the hydraulic system of FIG. 2 and the microprocessor system of FIG. 3 to obtain an extension of the jack shown in FIG. 6;

FIG. 9 is a sectional view of a hydraulic valve assembly included in the hydraulic circuitry of FIG. 2 for bleeding hydraulic fluid slowly to the jack of FIG. 6 to obtain the extension, to a relatively low pressure, of jacks not previously extended in levelling the vehicle;

FIG. 10 is a sectional view of a relief valve included in the hydraulic circuitry shown in FIG. 2;

Figure 12:
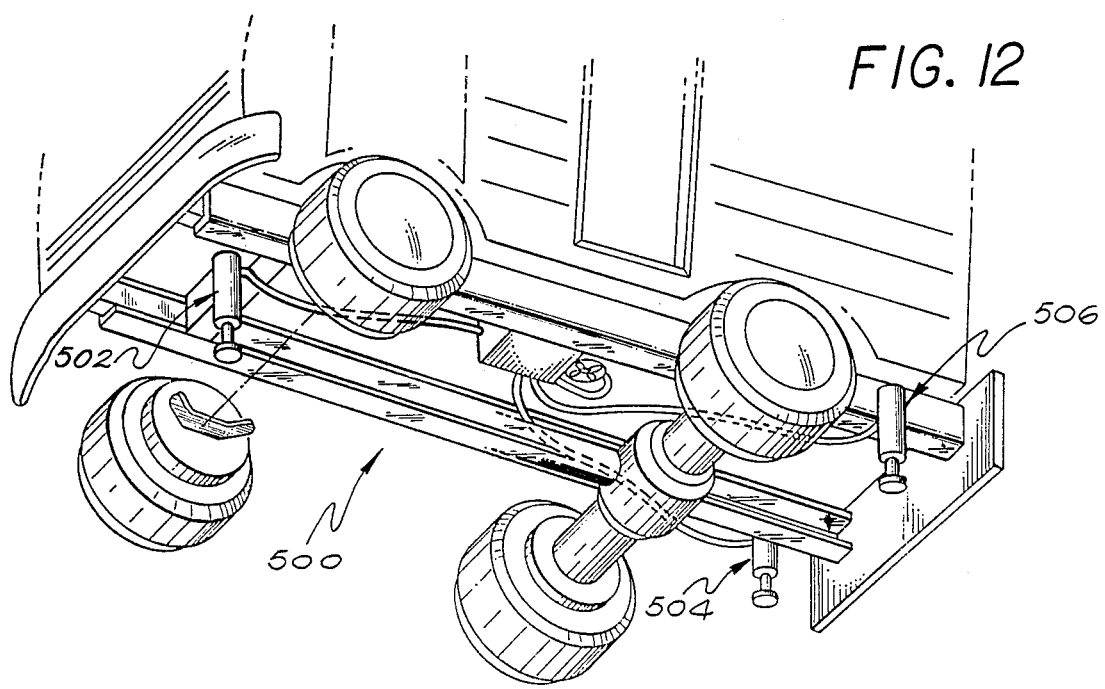
FIG. 12 is a schematic perspective view of another recreational vehicle in which only three jacks are used to level the vehicle.
Figure 14:
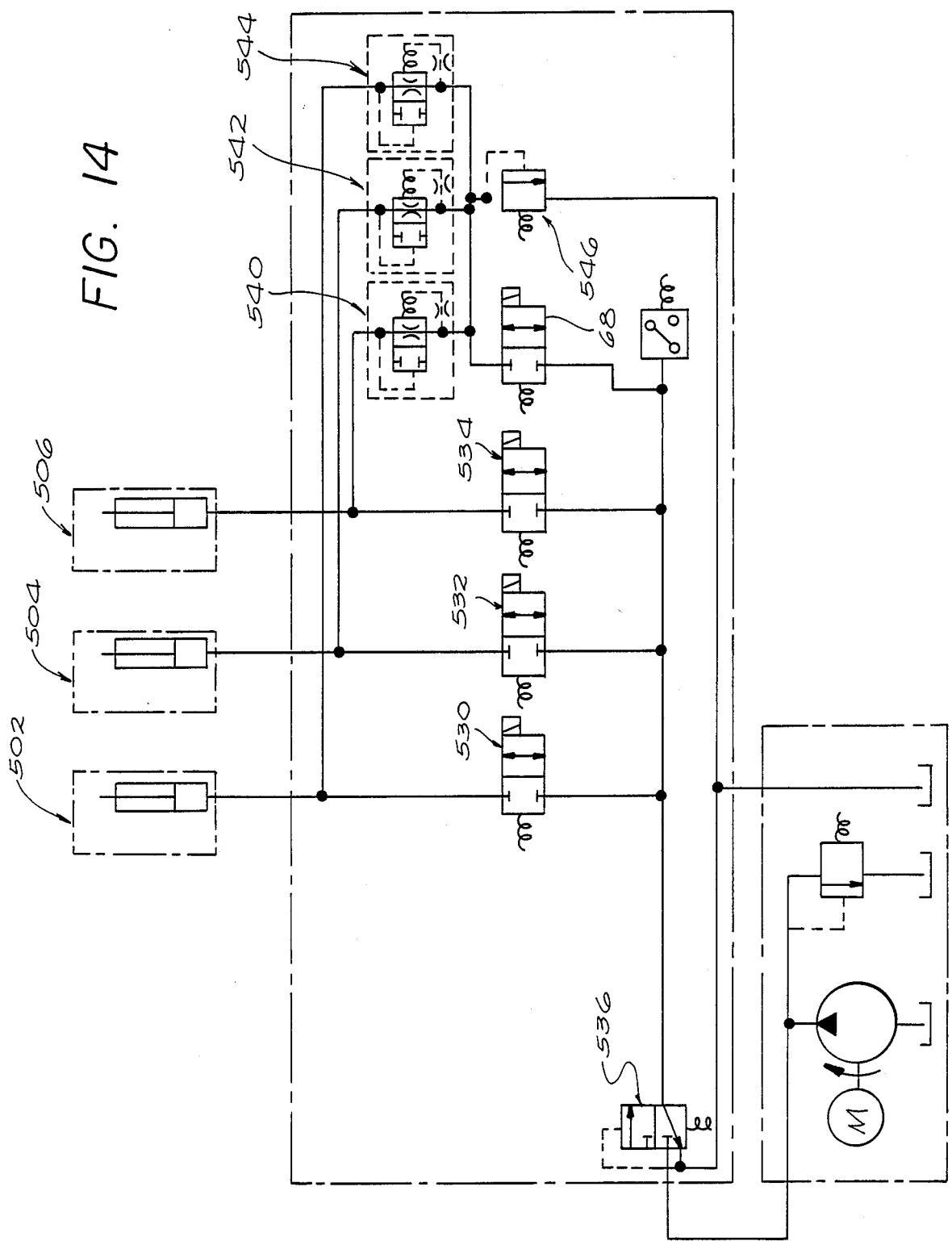

FIG. 14 schematically shows a hydraulic system for automatically levelling the recreational vehicle shown in FIG. 12.

Figure 1:
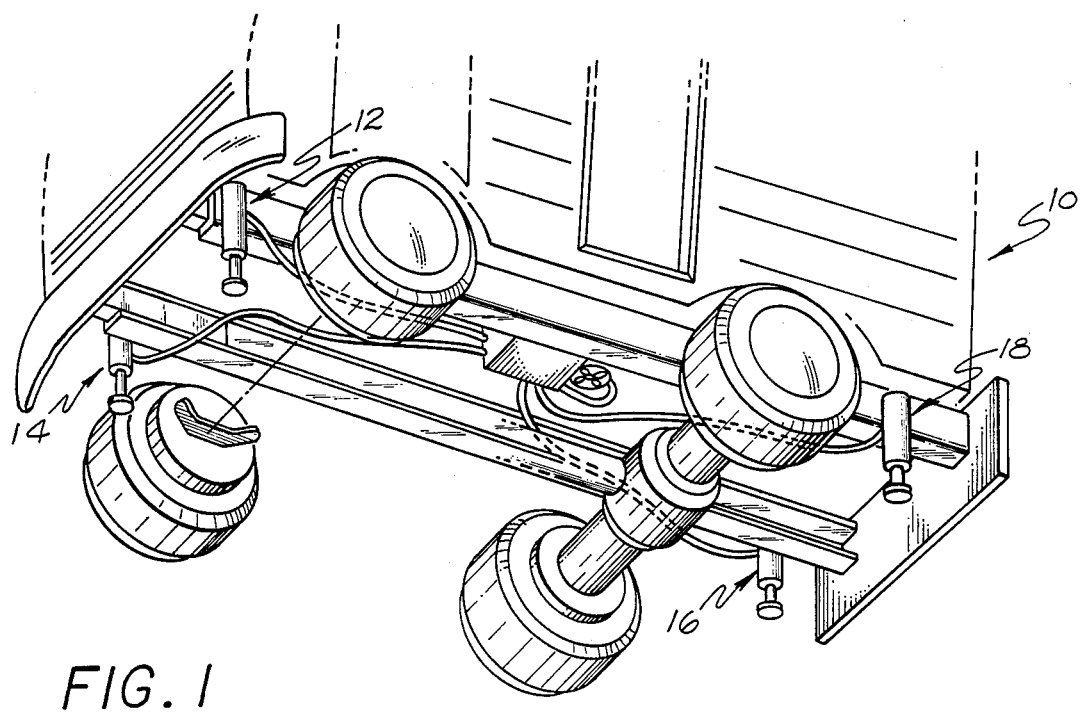

In one embodiment of the invention, a system is provided for automatically levelling, relative to gravity, a vehicle generally indicated at 10 (FIG. 1). The vehicle may be a recreational vehicle but it may also be any other type of vehicle such as a trailer. Accordingly, as used in the specification and claims, the term "vehicle" is intended to mean any type of carrier for transporting animate and inanimate objects.

The levelling of the vehicle 10 relative to gravity is provided by extending a plurality of jacks such as jacks generally indicated at 12, 14, 16 and 18. The jacks are preferably attached to the underside of the vehicle 10 at positions near the corners of the vehicle. The jacks 12, 14, 16 and 18 may be constructed in a conventional manner such as disclosed and claimed in U.S. Pat. No. 3,817,493 issued to me on Jan. 18, 1984 for a "Hydraulic Jack for Trailers", U.S. Pat. No. 4,165,861 issued to me on Aug. 28, 1979, for a "Vehicle Levelling System" or U.S. Pat. No. 4,061,309 issued to me on Dec. 6, 1977 for a "Vehicle Levelling System and Device Therefor". The jacks may be constructed to be disposed in a horizontal position and to become positioned to a vertical position before the jack becomes vertically extended. Alternatively, the jack may be disposed in a vertical position in that it is ready to be vertically extended without initially requiring any pivotal movement.

Each of the jacks 12, 14, 16 and 18 receives hydraulic fluid initially to become pivoted to a vertical position from a horizontal position when the jack is disposed against the underside of the vehicle 10 in substantially flush relationship with the underside of the vehicle. The jacks are then extended downwardly upon a further introduction of hydraulic fluid to the jacks. However, as will be appreciated, the jacks may also be constructed to become extended or retracted only in the vertical direction without first becoming pivoted from the horizontal position to the vertical position.

Figure 2:
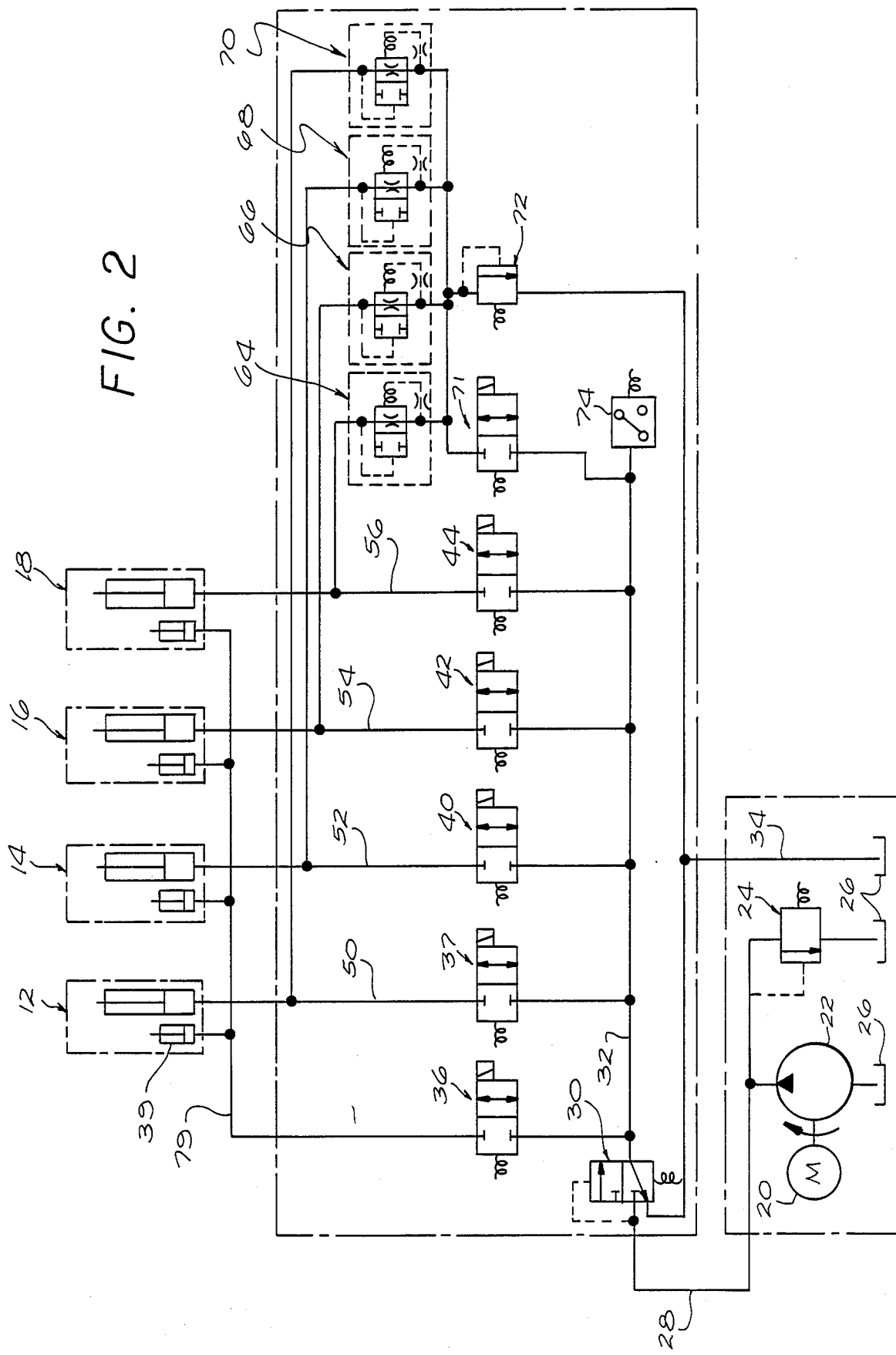

A hydraulic circuit for one embodiment of the invention is shown in FIG. 2. The hydraulic circuit shown in FIG. 2 includes a motor 20 which drives a pump 22. A hydraulic line extends from the pump 22 to a relief valve 24 which is set to operate at a particular pressure such as approximately three thousand pounds per square inch (3,000 psi). The relief valve 24 may be constructed in a conventional manner. The relief valve 24 operates to introduce hydraulic fluid to a reservoir 26 so as to provide a direct by-pass from the pump 22 to the reservoir 26 when excessive pressure occurs in the line as a result of a malfunction.

A hydraulic line 28 extends from the pump 22 to a hydraulic pressure switch generally indicated at 30. The hydraulic pressure switch 30 is shown in detail in FIG. 8. The switch 30 operates to pass the hydraulic fluid from the pump 22 to a hydraulic line 32 when the fluid introduced to the switch 30 has at least a particular pressure such as approximately six hundred pounds per square inch (600 psi). When the hydraulic pressure introduced to the pressure switch 30 is less than six hundred pounds per square inch (600 psi), the hydraulic fluid from the line 32 passes to the reservoir 24 through a line 34.

The hydraulic fluid in the line 32 is introduced to a valve, generally indicated at 36, which is shown in detail in FIG. 7. The valve 36 is operated electrically by an electrical switching arrangement generally indicated at 38 and shown in FIGS. 4 and 5. The valve 36 operates to pivot the jacks 12, 14, 16 and 18 from the horizontal disposition to the vertical disposition whenever a master switch is closed to obtain the operation of the automatic levelling system and when the automatic levelling cycle is started. The output from the valve 36 is connected to members 39 in the jacks 12, 14, 16 and for pivoting the extendible arms of the jacks from their horizontal positions to their vertical positions.

Valves generally indicated at 37, 40, 42 and 44 are also included and are respectively connected to the jacks 12, 14, 16 and 18 through hydraulic lines 50, 52, 54 and 56. The valves 37, 40, 42 and 44 are individually activated by the electrical switching arrangement 38 of FIGS. 4 and 5 in accordance with the tilting of the recreational vehicle 10 from a horizontal level. When the valves 37, 40. 42 and 44 become activated, hydraulic fluid passes to the associated jacks 12, 14, 16 and 18 to activate the jacks and to produce an extension of arms 48 in the jacks. The valves 37, 40, 42 and 44 may be constructed in a manner similar to the construction of the valve 36.

The lines 50, 52, 54 and 56 are respectively connected through bleeder valves 64, 66, 68 and 70 to a valve 71. The valve 71 may be constructed in a manner similar to that of the valve 36. Like the valves 38, 40, 42 and 44, the valve 71 is operative to obtain an extension of the jacks 12, 14, 16 and 18. However, the valve 71 is operative after the vehicle has been levelled. At this time, fluid flows through the valve 71 and the bleeder valves 60, 62, 64 and 66 to extend to the ground any jacks 10, 12, 14 and 16 still displaced from the ground. The jacks 10, 12, 14 and 16 are extended until they engage the ground with a relatively low force such as approximately two hundred pounds per square inch (200 psi).

A valve generally indicated at 72 is connected between the reservoir 26 and the valve 68. The valve 72 constitutes a relief valve to pass the fluid from the valve 71 to the reservoir 26 when the pressure of the fluid from the valve 71 exceeds a particular limit such as approximately two hundred pounds per square inch (200 psi). In this way, the jacks 12, 14, 16 and 18 are extended to the ground, after the levelling of the vehicle 10 relative to gravity, with such a low force that the levelling is not disturbed.

A hydraulic pressure switch 74 may be constructed in a conventional manner. The switch 74 may respond to a particular pressure such as approximately twenty-five hundred pounds per square inch (2,500 psi). When the switch 74 responds to such a pressure, it informs a microcomputer in FIG. 12 that this pressure limit has been reached. The microcomputer then discontinues the extension of the jack providing this hydraulic pressure and produces commands to the hydraulic system to obtain the extension of the next jack in the sequence after a delay sufficient in time for all transients in the movement of the vehicle 10 to disappear. A pressure as high as twenty-five hundred pounds per square inch (2,500 psi) may illustratively be produced in a jack when the jack has been fully extended or when excessive pressure is imposed on the jack for some reason.

Figure 11:
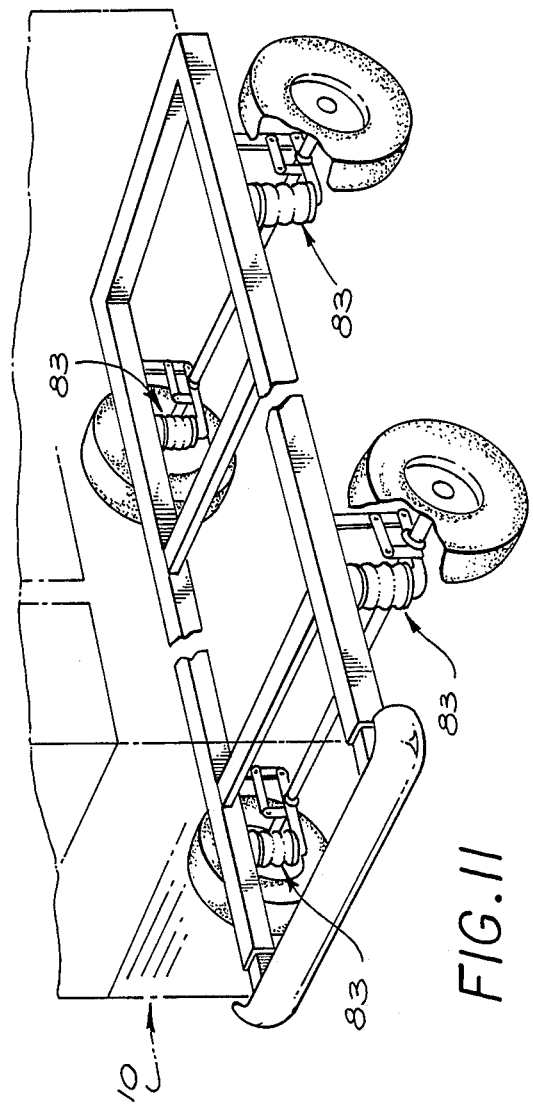
FIG. 11 is a schematic perspective of a recreational vehicle with air bags.

When the vehicle is travelling between destinations, the air bags 83 (FIG. 11) in the vehicle are filled with air to cushion the ride of the vehicle and enhance the comfort of the passengers in the vehicle. Before the jacks 12, 14, 16 and 18 are extended vertically, the air in the air bags is exhausted to allow the vehicle to settle to the positions where they are supported only by the axles of the vehicle. This is accomplished only under the control of the microprocessor shown in FIG. 3.

When the hydraulic system shown in FIG. 2 is to be operated, the motor 20 drives the pump 22 to produce a flow of hydraulic fluid. The pump 22 then introduces hydraulic fluid to the pressure switch 30, which is normally closed to prevent fluid from flowing through the switch. When the pressure of the hydraulic fluid reaches a preset value such as six hundred pounds per square inch (600 psi), the switch 30 is operated to provide for a delivery of fluid to the members 39 in the hydraulic jacks 10, 12, 14 and 16. The jacks are then operated to pivot the extensible arms in the jacks from the horizontal to the vertical positions.

After the extensible arms of the jacks 10, 12, 14 and 16 have been pivoted to the vertical positions, the jacks are extended downwardly in a particular sequence. This sequence is dependent upon the direction, or directions, in which the vehicle 10 is tilted relative to gravity. The sequential operation of the jacks occurs through hydraulic circuits including the pump 22, the pressure switch 30 and the valves 37, 40, 42 and 44. The sequential operation of the jacks continues until the vehicle has been levelled relative to gravity. The vehicle is generally levelled in a relatively short time period such as a period less than one (1) minute. A delay is generally provided between the extension of the arm in each jack in the sequence and the extension of the arm in the next jack in the sequence. This delay is provided to make sure that transients in each correction of the vertical disposition of the vehicle relative to gravity in one direction, by the operation of any particular one of the jacks 10, 12, 14 and 16, will not affect such corrections in any other direction such as by the operation of any of the other jacks.

It may sometimes happen that a jack may experience pressures as high as twenty-five hundred pounds per square inch (2,500 psi) as it is being extended. This may result from an extension of the jack to its full length. When this pressure is produced, the switch 74 produces a signal which the microcomputer processes. The microcomputer then instructs the next jack in the sequence to become extended after a suitable delay to eliminate any transients in the movement of the vehicle 10.

As previously explained, one of more of the jacks 12, 14, 16 and 18 may not be engaging the ground even after the vehicle has been levelled. The particular ones of the bleeder valves associated with such jacks then become operated to extend downwardly the arms of those jacks which still do not engage the ground. This occurs by a flow of fluid through the appropriate ones of the bleeder valves 64, 66, 68 and 70 and the valve 71. Such jacks are then extended downwardly until they engage the ground with a pressure such as two hundred pounds per square inch (200 psi). This extension of the appropriate ones of the jacks 12, 14, 16 and 18 facilitates the stabilization of the vehicle 10. It also prevents the levelling of the vehicle 10 relative to gravity from being upset by the downward extension of such jacks, particularly since the jacks are extended until they receive only a relatively low pressure.

After the recreational vehicle has been levelled relative to gravity and stabilized, the vehicle 10 is maintained in this position until the occupants of the vehicle are ready to travel to another camp site or to another destination. At such time, the extendible arms of the jacks 12, 14, 16 and 18 are retracted and are then pivoted to the horizontal positions. The bleeder valves 64, 66, 68 and 70 and the relief valve 71 are thereafter closed to introduce fluid from the jacks 12, 14, 16 and 18 directly to the reservoir 26 and prevent any fluid from being introduced through the valves to the jacks. By bleeding the hydraulic fluid from the jacks to prevent the pressures of the fluids in the jacks from accumulating, the jacks 12, 14, 16 and 18 cannot be inadvertently pivoted from the horizontal position to the vertical position while the vehicle 10 is travelling between destinations. This prevents the jacks from becoming inadvertently damaged.

The hydraulic circuit includes certain fail-safe features. For example, the pump 22 is short circuited to the reservoir 26 through the valve 24 when the fluid from the pump exceeds three thousand pounds per square inch (3,000 psi). The hydraulic circuitry shown in FIG. 2 also prevents the pressure of the fluid in the circuit from exceeding twenty-five hundred pounds per square inch (2,500 psi) while the jacks are being extended to level the vehicle relative to ground.

Figure 4:
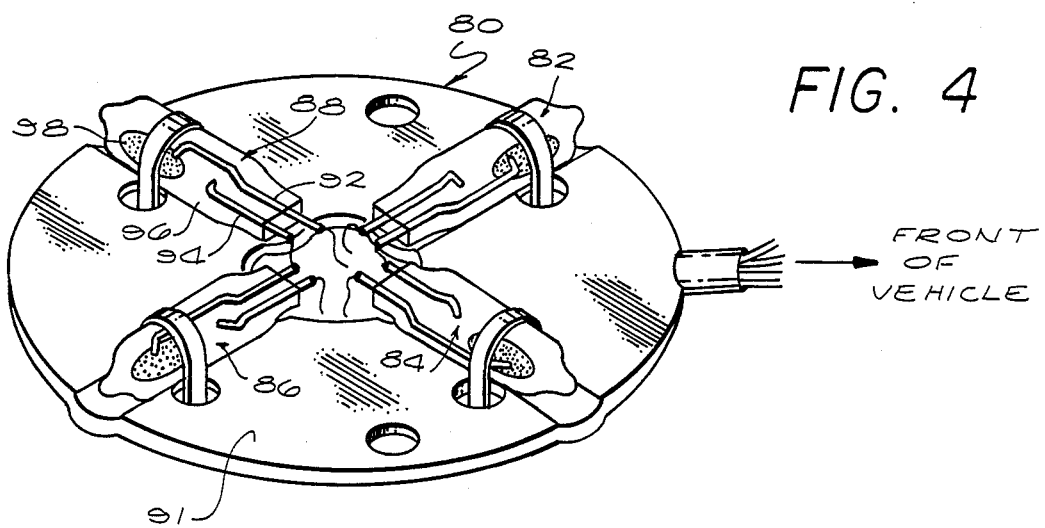
FIG. 4 is a schematic perspective view of a switching assembly for controlling the operation of the hydraulic system of FIG. 2 and the microprocessor system of FIG. 3.
Figure 5:
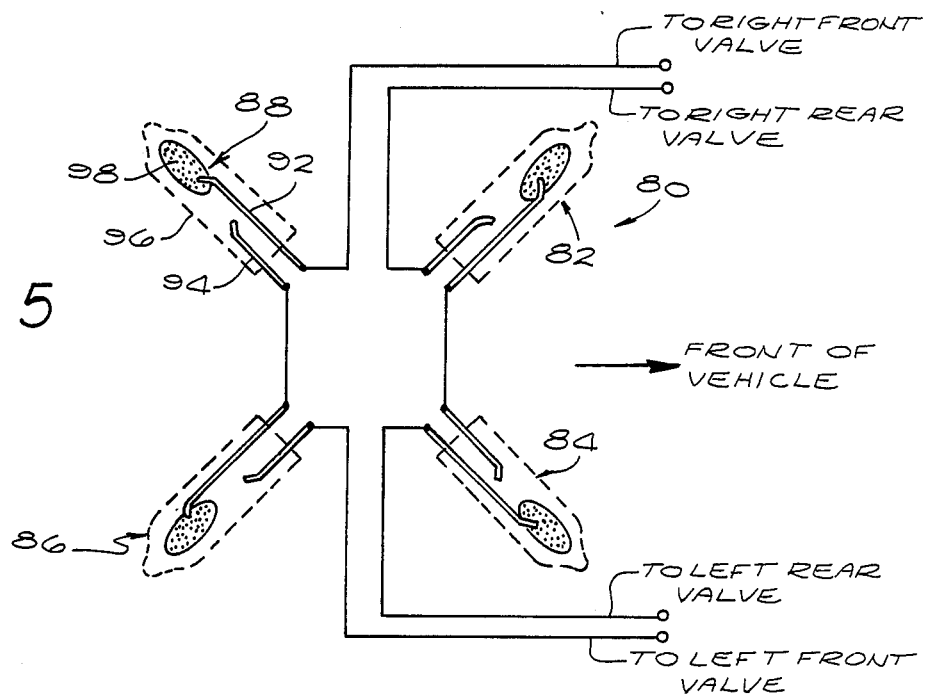
FIG. 5 is a circuit diagram showing electrical connections between particular ones of the switches shown in FIG. 4.

The embodiment of the invention also includes the switching assembly 38 in FIGS. 4 and 5. The switching assembly includes a plurality of switches such as the switches 82, 84, 86 and 88 disposed on a support member 90. Each of the switches 82, 84, 86 and 88 may be constructed in a similar manner. For example, the switch 88 may be provided with a pair of spaced contacts 92 and 94 disposed within an envelope 96.

A blob 98 of a suitably conductive fluid such as mercury is also disposed in the envelope 96. The blob 98 of conductive material is movable into engagement with the contacts 92 and 94 in accordance with the tilting of the recreational vehicle 10 from a horizontal level. When the blob 98 of conductive material engages the contacts 92 and 94, it produces an electrical continuity between the contacts. The blob 98 of conductive material is moved away from the contacts 92 and 94 when the recreational vehicle 10 is tilted in an opposite direction.

The switches 82, 84, 86 and 88 are disposed on the support member 91 to point towards the four corners of the recreational vehicle. For example, the switches 82, 84, 86 and 88 respectively point toward the left front, the right front, the right rear and the left rear corners of the recreational vehicle. Thus, the switch 86 becomes closed when the recreational vehicle 10 is tilted downwardly relative to gravity toward the left front end of the vehicle and the switch 82 becomes closed when the recreational vehicle 10 is tilted downwardly relative to gravity toward the right rear end of the vehicle. When the switch 86 becomes closed, the associated jack 12 becomes extended to raise the left front end of the vehicle from the ground. When the switch 82 beomes closed, the associated jack 16 becomes extended to raise the right rear end of the vehicle from the ground.

In levelling the vehicle, the rear of the vehicle is given priority. The rear of the vehicle is heavier than the front of the vehicle. Thus, if there is any ambiguity in resolving the particular one of the jacks to be operated first, the ambiguity is resolved in favor of operating one of the rear jacks before one of the front jacks.

Figure 8:
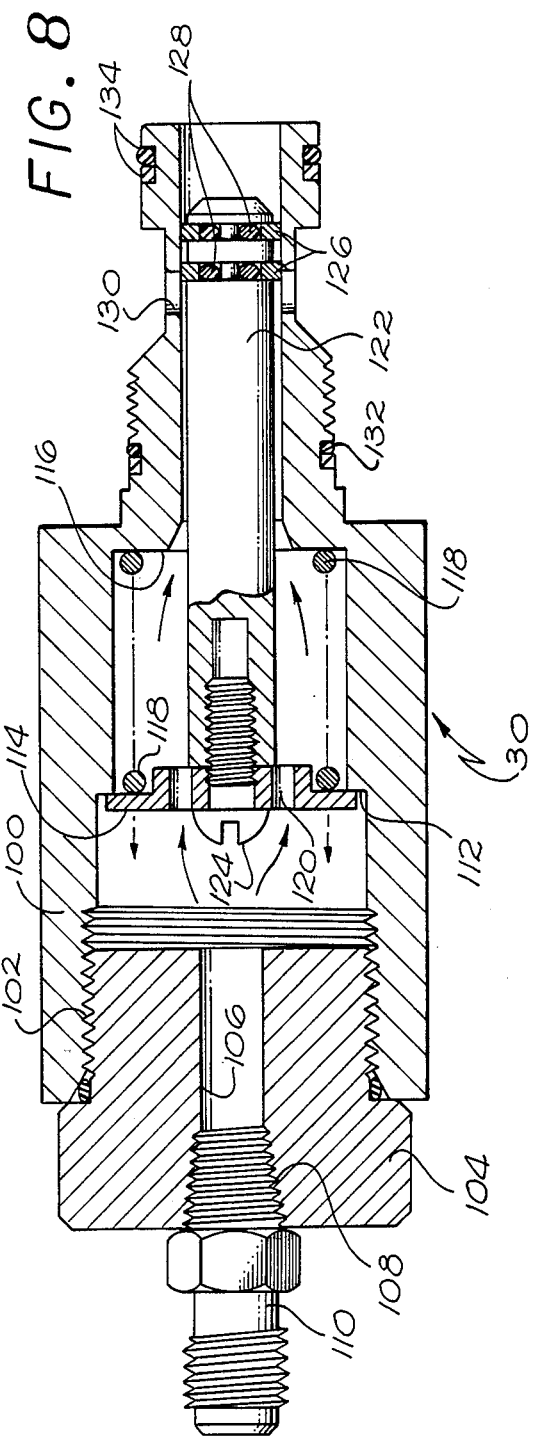
FIG. 8 is a sectional view of a hydraulic pressure switch included in the hydraulic circuitry of FIG. 2 for obtaining a controlled introduction of hydraulic fluid to the hydraulic valve assembly of FIG. 7 and the jack of FIG. 6 when the pressure of the hydraulic fluid in the hydraulic system of FIG. 2 exceeds a particular value.

The hydraulic pressure switch 30 in FIG. 2 is shown in detail in FIG. 8. It includes a hollow housing 100 internally threaded as at 102. A plug 104 is screwed on the threads 102 and is provided with a bore 106 which communicates with the hollow interior of the housing 100. The bore 106 is internally threaded as at 108 to receive a hollow threaded fitting 110.

The housing 100 is provided with an internal shoulder 112 to limit the axial movement of a guide 114 toward the right in FIG. 8. The housing 110 is also provided with an internal wall 116 at a position displaced from the guide 114. A helical spring 118 is disposed between the guide 114 and the wall 116 under constrained relationship. The guide 114 is provided with ports 120 so that fluid in the housing on one side of the guide 114 can communicate with fluid on the other side of the guide.

A piston 122 is mechanically coupled to the guide 114 by means of a threaded bolt 124. A pair of spaced rings 126 are disposed in sockets in the piston 122 at the right end of the piston in FIG. 8 and are accordingly movable with the piston. O-rings 128 are disposed in the sockets between the rings 126 and the piston to prevent fluid from leaking past the rings. The rings 126 are provided with an external diameter corresponding substantially to the internal diameter defining the hollow interior of the housing 100. The rings 126 are disposed adjacent ports 130 in the housing. O-rings 132 and 134 are disposed on the external surface of the housing 100 to seal the housing in an assembly which includes the hydraulic pressure switch 30.

The hydraulic fluid from the pump 22 in FIG. 2 flows into the housing 100 through the fitting 110. When the pressure of the fluid in the housing 110 is relatively low, the force on the constrained spring 118 is able to move the piston 122 to the left in FIG. 8 to a position where the rings 126 are to the left of the ports 130. This prevents any fluid in the housing 100 from flowing through the ports 130.

When the pressure of the hydraulic fluid in the housing 100 is greater than a particular value such as approximately six hundred pounds per square inch (600 psi), this pressure is able to overcome the bias provided by the constrained spring 118. The piston 122 is accordingly moved to the position shown in FIG. 8. This opens the ports 130 so that fluid is able to flow through the ports 130. This fluid is then introduced initially to the line 32 in FIG. 2 for operating the valve 36. This causes the jacks 12, 14, 16 and 18 to be pivoted from the horizontal position to the vertical position. The fluid is then introduced to the jacks 12, 14, 16 and 18 to extend the jacks sequentially.

The construction of the valve 36 in FIG. 2 is shown in detail in FIG. 7. In the embodiment shown in FIG. 7, a hollow housing 200 made from a suitable material such as steel is internally threaded at its right end to receive a plug 202. The plug 202 may be made from a relatively soft material such as aluminum and is provided with a passage 204.

A core member 206 made from a suitable member such as steel is fixedly disposed in the housing 200. The core member 206 is sealed relative to the housing 200 by O-rings 208. An armature 210 made from a suitable material such as steel is also disposed in the housing at substantially the same radial level as the core member 206 and in adjacent axial relationship to the core member.

The housing 200, the core member 206 and the armature 210 define a compartment 212. A winding 214 is disposed in the compartment 212 and is immersed in oil in the compartment. The housing 200, the core member 206 and the armature 210 define a closed magnetic path through which magnetic flux passes when the winding 214 is energized. The flow of this magnetic flux causes the armature 210 to be moved to the left in FIG. 7.

A hollow spacer 216 is disposed in the housing 200 at the left end of the housing in FIG. 7 to maintain the core member 206 in fixed relationship. A guide member 218 is disposed within the spacer 216 for axial movement within the spacer. A helical spring 220 is retained in a constrained relationship between the guide member 218 and the wall of the housing.

A dowel 222 extends through the core member 206 from a socket in the guide member 218. The dowel 222 extends through a passage in the core member 206. The dowel 222 contacts a spacer 226 at its right end. A needle 230 extends from the spacer 226 through the armature 210 into the passage 204. At its left end in FIG. 7, the needle 230 has a flared portion 228 which engages the wall of the armature 210. Bearings 232 are disposed on the needle 230. The bearings 232 are closely spaced relative to the wall defining the passage 204.

The end of the needle 230 is provided with a tapered configuration, preferably relatively gradual, as at 236. In one position of the needle 230, the tapered portion 236 of the needle 230 cooperates with a valve seat 238 to define a closed valve. The valve seat 238 is defined by a tapered shoulder in the wall defining the passage 204. The taper of the shoulder defining the valve seat 238 is preferably steeper than that provided on the end 236 of the needle 230 to facilitate valve closure.

The needle 230 is displaced from the wall defining the passage 204 to define a channel 240. An aperture 242 is disposed in the plug 202 at positions adjacent the channel 240 to communicate with the channel. O-rings 246 and 248 are disposed at spaced positions on the external wall of the housing to seal the housing in the assembly which includes the housing.

During the time that the solenoid winding 212 is not being energized, the spring 220 acts on the dowel 222 through the guide member 218 to move the dowel, the spacer 226 and the needle 230 toward the right in FIG. 7. This causes the valve defined by the tapered portion 236 of the needle and the valve seat 238 to become closed. When this valve is closed, fluid cannot flow through a hydraulic circuit including the aperture 242 and the passage 204.

The solenoid winding 212 is energized when the extensible arms of the jacks 12, 14, 16 and 18 in FIGS. 1 and 2 are to be pivoted from the horizontal position to the vertical position for subsequent extension. When the solenoid winding 212 is energized, the flow of magnetic flux through the magnetic circuit defined by the housing 200, the core member 206 and the armature 210 causes the armature to be moved to the left in FIG. 7. The movement of the armature 210 to the left causes the armature to act upon the flared portion 228 of the needle 230 to move the needle 230, the spacer 226 and the dowel 222 to the left in FIG. 7. The dowel 222 acts upon the guide member 218 to compress the spring 220.

When the armature 210 is moved to the left, the fluid in the channel 240 acts upon the needle 230 to move the needle to the left in FIG. 7. This displaces the tapered end 236 of the needle 230 from the valve seat 238 so that fluid is able to flow through the hydraulic circuit including the aperture 242 and the passage 204. The fluid flowing from the passage 204 acts upon the jacks 12, 14, 16 and 18 to pivot the extensible arms of the jacks from their horizontal positions to their vertical positions.

The apparatus shown in FIG. 7 and disclosed above has certain important advantages. It provides for a positive opening and closing of the valve formed by the tapered end 236 of the needle 230 and the valve seat 238. This results in part from the provision of the solenoid winding 212 and the provision of the magnetic circuit formed by the housing 200, the core member 206 and the armature 210. It further results from the force exerted by the fluid in the channel 224 against the needle 230.

The apparatus shown in FIG. 7 and disclosed above also has other important advantages. The fluid in the aperture 242 communicates through the bearings 232 and then acts against the spring 220, through the action of the dowel 222, tending to compress the spring. This means that the magnetic force generated by energizing the solenoid winding 214 to open the valve is reduced rather than increased as in a conventional valve when the pressure of the hydraulic fluid is increased in the aperture 242.

Another advantage occurs as the pressure of the fluid in the passage 204 increases to a value of approximately forty-five hundred pounds per square inch (4,500 psi). When this occurs, the force acts against the needle 230, the spacer 226, the dowel 222 and the guide member 218 to compress the spring 220. This allows fluid to pass through the valve defined by the seat 238 and the needle 230. The valve thus serves as a safety valve to protect the jacks in the event that the vehicle 10 is moved.

There are other advantages to the apparatus of FIG. 7. These advantages result from the fact that the valve defined by the tapered end 236 of the needle 230 and the valve seat 238 is closed gently, and without any chattering, when the solenoid winding 212 is de-energized. This results from the relative tapers on the portion 236 of the needle 230 and the valve seat 238. It also results in part from the formation of the valve seat 238 from a soft material such as aluminum. It further results from the formation of the dowel 222, the spacer 226 and the needle 230 as separate parts. By providing such separate parts, the movements of the needle 230 are damped relative to any movements imparted to the dowel 222. This is particularly true since the parts are disposed in oil. The dampened movements of the needle 230 also result from the action of the flared portion 228 of the needle 230 on the armature 210 in moving the armature to the right in FIG. 7. Since the armature 210 is a relatively heavy member, its inertia causes it to move to the right independently of the movement of the needle 230. As a result, the tapered end 236 of the needle 230 is able to engage the valve seat gently without producing any damage in these members.

The bleeder valve 64 is shown in FIG. 9. Identical constructions are provided for the bleeder valves 66, 68, and 70. The bleeder valve shown in FIG. 9 includes a housing 300 having a cavity 302 opened at one end and defined by oppositely disposed walls 304 and 306. A rod 308 is movably disposed in the cavity 302, and a collar 310 is slidably disposed on the rod 308 near one end of the rod. A collar 312 is fixedly disposed on the rod 308 at an intermediate position along the rod. A spring 314 is disposed in compressed relationship between the slidable collar 310 and the fixed collar 312. A collar 316 is disposed on the end of the rod opposite the spring 314 and an O-ring 318 is disposed on the rod immediately interior to the collar 316.

A sleeve 320 is tightly disposed within the housing 300 in the open end of the cavity 302 and is in turn provided with a hollow cavity 322. The cavity 322 is narrowed as at 324 so that the rod is guided by the narrowed portion 324 of the cavity as it extends through the cavity. The cavity 322 is provided with a progressively flared opening 328 and is adapted to cooperate with the O-ring 318 to seal the cavity 322 at the end opposite the housing 300.

A packing 330 is disposed in the cavity 322 at a position slightly interior of the flared opening 328. The packing 330 is displaced from the wall defining the cavity 322 so that fluid can flow through this space. A passage 332 is disposed between the packing 330 and the narrowed portion 324 of the cavity 322.

The relief valve 72 illustrated schematically in FIG. 1 is shown in detail in FIG. 10. The relief valve 72 includes a housing 350 having a cavity 352. A closure member 354 is disposed in the cavity 352 at one end to close the cavity. A seal 356 is disposed in the cavity between the housing 350 and a socket in the closure member 354.

The closure member 350 is provided with a socket 358 to receive one end of a rod 360 and to confine the path of movement of the rod to a direction corresponding to the axis of the rod. A collar 362 is fixedly disposed on the rod 360 at a position displaced from the socket 358. A spring 364 is retained in a compressed relationship between the collar 362 and the closure member 354.

The housing 350 has a narrowed portion 366 to define a guide to limit the movement of the rod 360 in an axial direction. The 360 has a bulbous portion 368 at its outer end to define a valve with a seat 370 produced by a stepped configuration in the cavity 358. A passage 372 is provided in the housing 350 between the seat 370 and the narrowed portion 366 of the housing 350. A channel 374 is provided between the rod 360 and the cavity 352 in the area between the passage 372 and the bulbous portions 363 by making the rod undersized relative to the cavity in this area.

As previously discussed, not all of the jacks 12, 14, 16 and 18 may be extended to obtain a levelling of the vehicle. Under such circumstances, those jacks not previously extended to level the vehicle are then extended to produce a relatively low pressure such as two hundred pounds per square inch (200 psi) against the ground. This is accomplished by opening the particular ones of the bleeder valves 64, 66, 68 and 70 associated with the jacks to be extended and by closing the relief valve 72.

The opening of the particular ones of the bleeder valves 64, 66, 68 and 70 and the closing of the relief valve 72 to obtain the extension of the associated jacks to a pressure of approximately 200 psi may be seen from the following discussion. When such valves are to be extended, the pressure of the fluid in the passageways 332 (FIG. 9) of the bleeder valves associated with such jacks is high. This pressure overcomes the compressive force of the spring 314 to move the rod 308 to the right in FIG. 9. This opens the valve defined by the O-ring 318 and the tapered surface 328 in the housing 300 so that fluid flows from the jack through the cavity 302 and the passage 332 in FIG. 9. The passage 332 in FIG. 9 may be considered as, or communicating with, the area to the right of the bulbous portion 368 in FIG. 10. As a result, the fluid flows downwardly in FIG. 10 past the relief valve (FIG. 10) to the reservoir 26.

Since the fluid flows downwardly in FIG. 10 past the relief valve 72 in that Figure, it accumulates a pressure to the right of the rod 360 in FIG. 10. This pressure is sufficiently high to overcome the pressure of the spring 364 so that the rod 360 is moved to the left in FIG. 10. This causes the bulbous portion 368 of the rod 360 to move against the seat 370 so that the valve defined by the bulbous portion and the seat is closed. This prevents any fluid from flowing through the channel 374 to the passage 372 in FIG. 10.

When the pressure in the jacks being extended after the levelling of the vehicle reaches a pressure of two hundred pounds per square inch (200 psi), the O-ring 318 in FIG. 9 is positioned close to the tapered surface 328 of the housing 300. This causes the valve defined by the O-ring and the tapered surface to be essentially closed. This prevents fluid from flowing in FIG. 9 from the jack through such valve and the cavity 302 to the passage 332. As a result, the jack cannot be extended after the pressure in the valve has reached a pressure of two hundred pounds per square inch (200 psi).

Since there is no flow of fluid in the passage 332, the area to the right of the bulbous portion 368 in FIG. 10 has a relatively low pressure. The spring 364 in FIG. 10 is then able to act on the rod 360 to move the rod to the right in FIG. 10. This opens the valve defined by the bulbous portion 368 of the rod 360 and the seat 370. As a result, fluid is able to flow through the channel 374 and the passage 372 in FIG. 10 to the reservoir 26. By opening the relief valve shown in FIG. 10, any fluid in the jacks is bled to the reservoir so that the jacks cannot be further extended.

While the vehicle is travelling, the pressure of the fluid in the jacks 12, 14, 16 and 18 is low. This causes the spring 314 in FIG. 9 to move the rod 308 to the right in FIG. 9 so that the valve defined by the O-ring 318 and the tapered surface 328 of the sleeve 322 becomes opened. Because of the low pressure of the fluid, the spring 364 in FIG. 10 moves the rod 360 to the right in FIG. 10. This causes the valve defined by the bulbous portion 368 of the rod and the seat 370 to open.

As a result of the opening of the valves in FIGS. 9 and 10, fluid flows through a hydraulic circuit including the jack, the valve defined by the O-ring 318 (FIG. 9) and the tapered surface 328 of the sleeve 322, the passage 332, the valve defined by the bulbous portion 368 and the seat 370 (FIG. 10), the passage 372 and the reservoir 26. The flow of fluid through this circuit prevents fluid from accumulating in the associated jack while the vehicle is travelling. This is desirable because an accumulation of fluid in the jack may cause the pressure of the fluid in the jack to increase to a value where the jack may become extended as the vehicle is travelling. Such an extension of the jack may cause damage to the jack or the vehicle, or both, because of the movement of the vehicle.

Figure 6:
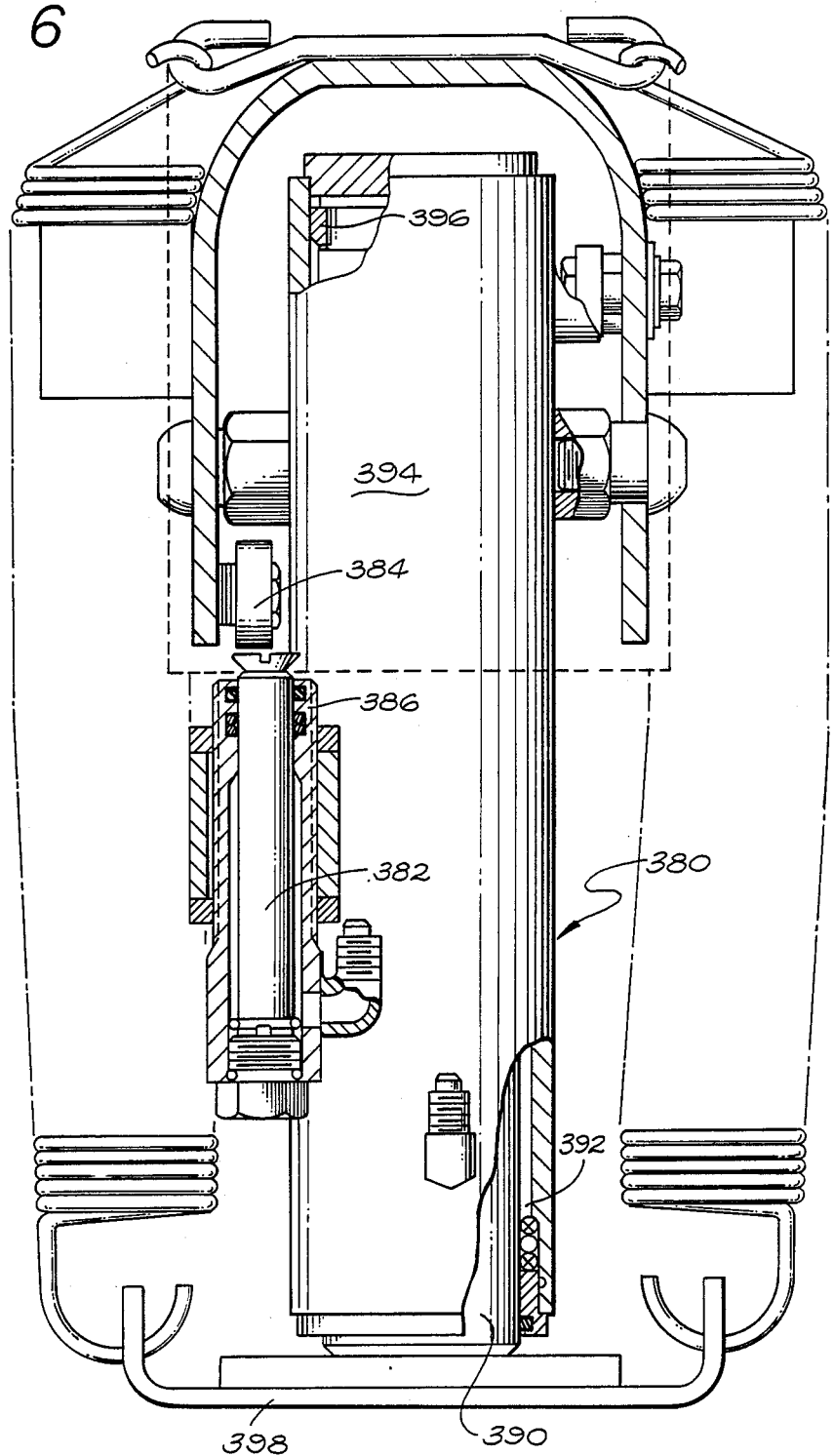
FIG. 6 is a sectional view of one of the hydraulic jacks which is included in the recreational vehicle of FIG. 1 and the hydraulic system of FIG. 2.

FIG. 6 is a side view of a jack which may be used in the embodiment discussed above. FIG. 6 corresponds substantially to FIG. 4 of my U.S. Pat. No. 4,165,861. Assuming a support assembly 380 to be in an upper storage position as shown in FIG. 6, the outer end of a plunger 382 will react against a roller 384 as the plunger is extended from a cylinder 386. Such a reaction will cause the support assembly 380 to rotate around pivots 388 while the outer end of the plunger 382 rotates around the roller 384. When the pivotal movement of the plunger 382 has been completed, a plunger 390 is extended upon introduction of a suitable hydraulic fluid. Such extension is limited by abutment between a shoulder 392 in the interior wall of a cylinder 394 and a stop collar 396 carried on the plunger 390. A foot or pad 398 serves to provide a relatively large flat surface for contact with the ground.

Figure 3:
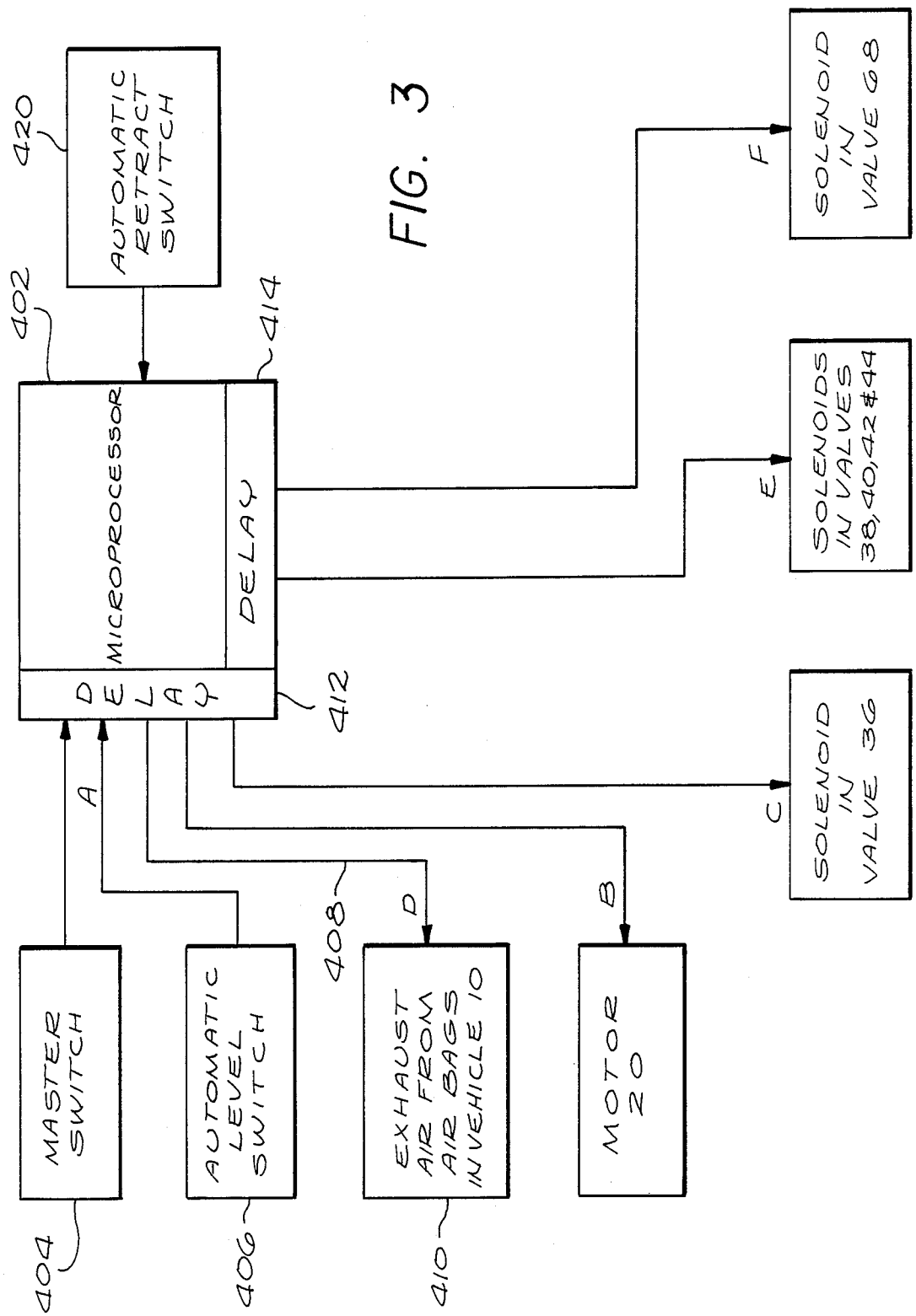
FIG. 3 is a schematic block diagram of a microprocessor system for controlling the operation of the hydraulic system shown in FIG. 2.

FIG. 3 schematically shows an electrical system generally indicated at 400 and including a microprocessor 402 for operating in the proper sequence the different mechanisms discussed above. The system shown in FIG. 3 also includes a master switch 404 and an "Automatic Level" switch 406 for controlling the operation of the system. When the master switch 404 and the "Automatic Level" switch 406 are closed as first steps (indicated as "A" in FIG. 3) in the sequence, the microprocessor 402 is operative to energize the motor 20 in FIG. 2, as indicated by a letter "B" in FIG. 3. The motor 20 then operates the pump 22 to obtain a flow of fluid through the hydraulic circuit shown in FIG. 3. The solenoid in the valve 36 is then energized, in accordance with the processing of data by the microprocessor 402, to obtain a flow of fluid through the jacks 12, 14, 16 and 18 to pivot the extensible arms of the jacks from the horizontal positions to the vertical positions. This is indicated by a letter "C" in FIG. 3. As previously disclosed, however, this step may be eliminated if the jacks are only vertically extensible without first being pivoted from the horizontal position to the verticle position.

The microprocessor 402 is then operative to obtain an exhaustion of the air in the air bags 83 (FIG. 11) for cushioning the ride of the vehicle 10. This is indicated by a line 408 extending from the microprocessor 402 to a box 410 designated as "Exhaust Air From Air Bags in Vehicle 10". It is also indicated by a letter "D" adjacent the line 408 to show that this is the next step in the sequence after the pivoting of the jacks from the horizontal position to the vertical position.

The solenoids in the valves 37, 40, 42 and 44 are then energized in a particular sequence to level the recreational vehicle relative to gravity. This is indicated by a letter "E" in FIG. 3. The sequence of energizing the solenoids in the valves 37, 40, 42 and 44 is dependent upon the particular direction or directions in which the recreational vehicle is tilted downwardly relative to gravity. As previously described, preference is given by the switching circuitry shown in FIGS. 4 and 5 to operate the jacks at the rear of the vehicle before the jacks at the front of the vehicle in case of any ambiguity in the sequence of operating the jacks because the rear of the vehicle is heavier than the front of the vehicle. By raising the rear of the vehicle before the front of the vehicle, only a minimal extension may have to be made in the jacks at the front of the vehicle in order to level the vehicle.

Although preference is given to levelling the rear of the vehicle 10 over levelling the front of the vehicle in case there is any ambiguity, the sequence of operating the jacks 12, 14, 16 and 18 is actually dependent upon the direction in which the vehicle is tilted. The first one of the jacks 12, 14, 16 and 18 to be levelled is that one which is skewed the most from the direction of gravity. This selection is made by the microprocessor 402 in accordance with the closure of the switches shown in FIGS. 4 and 5. Generally one of the jacks adjacent such first selected jack is the next to be selected since it is the jack most skewed from the direction of gravity after the corner of the vehicle corresponding to the positioning of the first selected jack has been made level relative to gravity.

When the second one of the selected jacks has been extended sufficiently to make the corresponding corner of the vehicle level relative to gravity, the third jack is then operated. This third jack is generally adjacent to the second selected jack in the same direction of rotation as from the first jack to the second jack. The fourth jack selected for extension is in turn generally adjacent to the third selected jack in the same direction of rotation as from the second jack to the third jack.

It may be that the levelling operation relative to gravity is not yet consummated after the four (4) jacks have been operated in sequence. If such levelling relative to gravity is not yet consummated, the four jacks are again operated in the same sequence until the levelling has been consummated. Generally the levelling relative to gravity is consummated after only one sequence of operating the different jacks or, at most, after only two (2) sequences of operating the different jacks. As will be appreciated, the operation of the jacks through only one sequence or through more than one sequence is controlled by the microprocessor 402. Thus, although the operation of the solenoids in the valves 38, 40, 42 and 44 is indicated by the single letter "E" in FIG. 3, it will be appreciated that the operation of those valves may occur through a number of steps, all under the control of the microprocessor 402.

After each operation of one of the jacks 12, 14, 16 and 18, a delay is provided by the microprocessor 402 before the next one of the jacks in the sequence is operated. This is indicated by delays 412 and 414 in FIG. 3. These delays are provided so that any transients in the movement of the vehicle 10 as a result of the operation of each jack will be dissipated before the next one of the jacks in the sequence is operated. The delay is provided for each jack after the operation of the jack is interrupted by the conversion of the associated switch in FIGS. 4 and 5 from a closed state to an open state. It will be appreciated that the delays 412 and 414 are shown in FIG. 3 as being associated with the microprocessor 402 since the delays may be provided as a result of the programming of the microprocessor.

The microprocessor 402 senses when the vehicle 10 is levelled relative to gravity because all of the switches in FIGS. 4 and 5 are simultaneously opened. When the vehicle 10 is levelled relative to gravity, the microprocessor 402 causes the solenoid in the valve 71 to be energized after a suitable time delay. This produces an operation of all of the jacks 12, 14, 16 and 18 still not contacting the ground. Such jacks are operated until they engage the ground. Such operation is indicated by a letter "F" in FIG. 3. In this way, the stability of the vehicle 10 is enhanced without affecting the levelling previously provided in the vehicle.

When it is desired to prepare the vehicle 10 for departure from a campsite, the "Master" switch 404 and an "Automatic Retract" switch 420 are operated. When the "Master" switch 404 is on and the "Automatic Retract" switch 420 is closed, the microprocessor 402 causes the valves 37, 38, 40, 42 and 44 to be operated so that the fluid in the jacks 12, 14, 16 and 18 is returned to the reservoir 26 and the extendible arms in the jacks become retracted. Such retraction of the jacks 12, 14, 16 and 18 can occur simultaneously or in sequence. The retraction of the jacks 12, 14, 16 and 18 and the pivoting of the jacks to the horizontal position occur because of the force of the retracting springs on the jacks.

It will be appreciated that the system shown in FIG. 2 can be operated manually as well as automatically. This can be accomplished by providing a manually operated switch for each jack and by manually operating the switch until an indication is provided on a visual sensor that the vehicle 10 has been levelled at the position on the vehicle corresponding to the position where the jack is coupled to the vehicle. However, when the "Automatic Level" switch 406 is operated, the automatic levelling of the vehicle 10 has a priority over any manual levelling of the vehicle 10.

As will be appreciated, levelling of a recreational vehicle can be provided by controlling the vertical disposition of three (3) spaced points relative to gravity. For example, the levelling of a recreational vehicle, generally indicated at 500 in FIG. 12, relative to gravity can be controlled by three jacks generally indicated at 502, 504 and 506. The jacks 502, 504 and 506 are disposed at spaced positions on the vehicle at the underside of the vehicle. The jacks 504 and 506 may be disposed at the opposite rear ends of the vehicle 500 and the jack 502 may be disposed at the front of the vehicle at a position intermediate the front ends of the vehicle. Actually, the use of only three (3) jacks should be theoretically superior to the use of four (4) jacks as in the previous embodiment shown in FIGS. 1 through 10 since an object can be levelled by levelling only three (3) spaced positions on the object. The jacks 504 and 506 are disposed at the opposite rear ends of the vehicle 500 since the rear end of the vehicle is heavier than the front of the vehicle.

Since the length of the vehicle 500 is generally significantly longer than its width, the jacks 502, 504 and 506 do not define an equilateral triangle but only an isosceles triangle. This results from the fact that the distance between the jacks 504 and 506 is considerably less than the distance between the jacks 502 and 506 or between the jacks 502 and 504. In view of the particular geometry involved, problems may arise in the priorities of operating the jacks 502, 504 and 506 if the recreational vehicle should be tilted downwardly toward the rear relative to gravity. These priorities are preferably resolved by operating the rear jacks before the forward jack if there is any question to which jack should be operated first.

Figure 13:
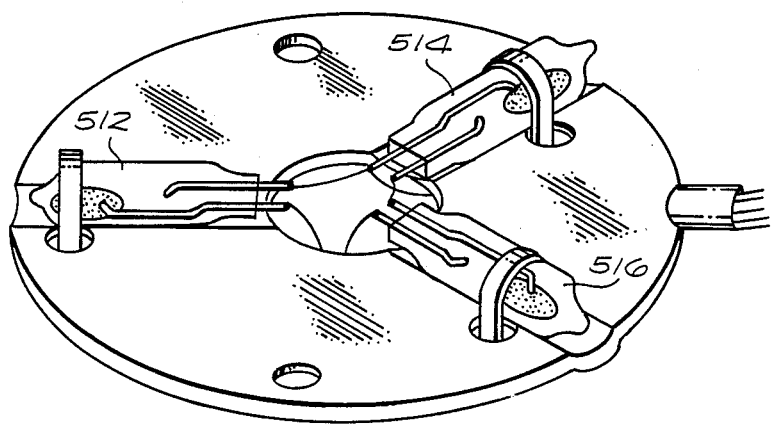
FIG. 13 is a schematic perspective view of a switching assembly for use with the vehicle of FIG. 11.

Any ambiguities in the priorities of operating the jacks 502, 504 and 506 can be resolved by providing a switching arrangement such as shown in FIG. 13. This arrangement includes a support member 510 on which a plurality of switches 512, 514 and 516 are disposed. The switches 512, 514 and 516 may be mercury switches and may be constructed in a manner similar to that disclosed above for the switches shown in FIGS. 4 and 5. The switches 512, 514 and 516 may be respectively disposed at positions to obtain an operation of the jacks 502, 504 and 506 when they are closed. For example, when the switch 512 is closed, it indicates that the vehicle 500 is tilted downwardly in the forward direction relative to gravity. This causes the jack 502 to be extended so that the front end of the vehicle 500 becomes raised relative to gravity.

FIG. 13 shows a hydraulic circuit for operating the jacks 502, 504 and 506 in sequence. The hydraulic circuit shown in FIG. 13 is similar to the circuit shown in FIG. 2 except for a limited number of differences. For example, only the three jacks 502, 504 and 506 are included. The extension of these jacks is respectively controlled by three valves generally indicated at 530, 532 and 534. Each of these valves may be constructed in a manner similar to that shown in FIG. 7. The hydraulic circuit shown in FIG. 13 also includes a pressure switch generally indicated at 536 and corresponding to that shown in FIG. 8. Three bleeder valves 540, 542 and 544 corresponding to those shown in FIG. 9 and a relief valve 546 corresponding to that shown in FIG. 10 are also included.

Although this application have been disclosed and illustrated with reference to particular applications, the principles involved are susceptible of numerous other applications which will be apparent to persons skilled in the art. The invention is, therefore, to be limited only as indicated by the scope of the appended claims.

I claim:

1. In combination for use in a vehicle to level the vehicle relative to gravity,
   a plurality of jacks each disposed on the vehicle at a strategic position on the vehicle and each being extensible to adjust the vertical disposition of the vehicle at the strategic position,
   means operatively coupled to the jacks in the plurality for operating the jacks in a sequence to level the vehicle,
   a plurality of bleeder valves each associated with an individual one of the jacks in the plurality,
   a relief valve, and
   means including the bleeder valves and the relief valve for obtaining an extension until the exertion of a particular pressure by the ground on particular ones of the jacks not previously extended in levelling the vehicle and for thereafter preventing such jacks form being extended,
   the bleeder valves associated with the particular valves being opened during the extension of such jacks to obtain the imposition of the particular pressure on such jacks and the relief valve thereafter being opened.

2. In combination for use in a vehicle to level relative to gravity,
   a plurality of jacks disposed at strategic positions in operatively coupled relationship to the vehicle to support the vehicle on the ground, the jacks being extensible to adjust the positioning of the vehicle relative to gravity,
   means for sensing the level of the vehicle at the strategic positions at each instant relative to gravity,
   means responsive to the sensing means for obtaining extensions of the jacks in a particular sequence and through particular vertical distances to level the vehicle relative to gravity, and
   means including bleeder valve and a relief valve operative in a cooperative relationship for obtaining, upon a levelling of the vehicle, a further extension of any particular jacks experiencing in the plurality a pressure less than a particular value until such jacks experinece the particular pressure,
   the bleeder valve having open and closed positions and each of the bleeder valves being associated with a different one of the jacks and the bleeder valve for the particular jacks being open and the relief valve being closed during the extension of the particular jacks in the plurality until such jacks experience the particular pressure and the bleeder valves for the particular jacks being closed and the relief valve being open when the particular jacks in the plurality have reached the particular pressure.

3. In a combination as set forth in claim 2,
   the bleeder and relief valves being opened while the vehicle is travelling.

4. In a combination as set forth in claim 2,
   the bleeder and relief valves being hydraulic and the bleeder and relief valves being disposed in common hydraulic circuits.

5. In combination for use in a vehicle to level the vehicle relative to gravity, a plurality of jacks disposed at strategic positions on the vehicle in operatively coupled relationship to the vehicle to support the vehicle on the ground, the jacks being extensible to adjust the positioning of the vehicle relative to gravity, means for sensing the level of the vehicle at the strategic positions at each instant relative to gravity, means responsive to the sensing means for obtaining extensions of the jacks in a particular sequence and through particular vertical distances to level the vehicle relative to gravity, a relief valve, a plurality of bleeder valves each associated with an individual one of the jacks, and means including the relief valve and the bleeder valve for a particular one of the jacks in the plurality and responsive to a levelling of the jacks and a pressure less than a particular value in such particular one of the jacks for obtaining an operation of the bleeder valve and the relief valve in a first particular relationship to advance the particular jack until the particular jack receives the particular pressure and responsive to the particular pressure in the particular jack for obtaining an operation of the bleeder valve and the relief valve in a second particular relationship to prevent the pressure received by the particular jack from exceeding the particular value.

6. In a combination as set forth in claim 5, the means including the relief valve and the bleeder valves for the jacks being responsive during the travelling of the jacks for obtaining an operation of the relief valve and the bleeder valves in a third particular relationship to prevent pressure from accumulating in the jacks.

7. In a combination as set forth in claim 6, the relief valve having open and closed relationships and the bleeder valve having open and closed relationships and the bleeder valve for the particular jack being open and the relief valve being closed in the first particular relationship and the bleeder valve for the particular jack being closed and the relief valve being opened in the second particular relationship and the bleeder valves and the relief valve being opened in the third particular relationship.

8. In a combination as set forth in claim 5, the bleeder valves for the jacks and the relief valve being hydraulic.

9. In combination for levelling a vehicle, a plurality of jacks constructed to be coupled to the vehicle at the underside of the vehicle at strategic positions around the pariphery of the vehicle, each of the jacks being operative to raise or lower the vehicle relative to gravity at the strategic position at which is is disposed, a support member, a plurality of switches disposed on the support member, each of the switches having opened and closed states and each being positioned to indicate the downward tilting of the vehicle relative to gravity in the direction of an individual one of the jacks in the plurality, means including the jacks and responsive to the closure of individual switches in the plurality and to particular pressures in the jacks for activating individual ones of the jacks in accordance with the individual closure of the switches to obtain a levelling of the vehicle, a hydraulic relief valve, a plurality of hydraulic bleeder valves each associated with an individual one of the jacks, and means (i) establishing a first hydraulic circuit through the hydraulic relief valve and a particular one of the hydraulic bleeder valves in the plurality for providing an actuation of the particular jack associated with the particular bleeder valve when the particular jack experiences a pressure less than a particular value after the vehicle has been leveled and (ii) establishing a second hydraulic circuit through the hydraulic relief valve and the particular one of the hydraulic bleeder valves in the plurality when the particular bleeder valve experiences the particular pressure so as to prevent the pressure in the particular jack from experiencing a pressure greater than the particular pressure.

10. A combination as set forth in claim 9, the establishing means being operative to prevent the establishment of any hydraulic circuit through the relief valve and the bleeder valves in the plurality when the vehicle is travelling.

11. A combination as set forth in claim 9, including, means responsive to each operation of at least one of the jacks for delaying the operation of any of the other jacks for a particular period of time to inhibit the response of the jacks to transients, 12. A combination as set forth in claim 9 wherein the vehicle is provided with air bags and the air bags are filled with air while the vehicle is travelling and wherein the air is exhausted from the air bags before the vehicle is levelled.

13. A combination as set forth in claim 11 wherein a reservoir is provided and wherein the first hydraulic circuit provides for a flow of fluid through the particular bleeder valve to the particular jack for pressures less than the particular pressure in the particular jack and wherein the second hydraulic circuit provides for a flow of fluid through the relief valve to the resevoir when the particular jack experiences at least the particular pressure.

14. A combination as set forth in claim 10, including, means responsive to at least one operation of at least one of the jacks for delaying the operation of any of the other jacks for a particular period of time to inhibit the response of the jacks to transients, air bags disposed in the vehicle and filled with air while the vehicle is travelling, means for exhausting the air from the air bags before the vehicle is levelled, and a reservoir in the vehicle, the first hydraulic circuit providing for a flow of fluid through the particular bleeder valve to the particular jack for pressures less than the particular pressure in the particular jack and the second hydraulic circuit providing for a flow of fluid through the relief valve to the reservoir when the particular jack experiences at least the particular pressure.

15. A combination as set forth in claim 9, the establishing means also providing a third hydraulic circuit through the bleeder valves and the relief valve to prevent hydraulic fluid from accumulating through the jacks while the vehicle is travelling.

16. A combination as set forth in claim 14, the establishing means also providing a third hydraulic circuit through the bleeder valves and the relief valve to prevent hydraulic fluid from accumulating in the jacks while the vehicle is travelling, the third hydraulic circuit providing for a flow of fluid through the bleeder valves and the relief valve.

17. In combination for use in a vehicle to level the vehicle relative to gravity and for maintaining the vehicle fixedly in the leveled position relative to the ground, a plurality of jacks constructed to be coupled to the vehicle at the underside of the vehicle at strategic positions around the periphery of the vehicle, each of the jacks being operative to raise or lower the vehicle relative to gravity at the strategic position at which it is disposed, a support member, a plurality of switches disposed on the support member, each of the switches having open and closed states and each being positioned to indicate the downward tilting of the vehicle relative to gravity in the direction of an individual one of the jacks in the plurality, a plurality of first valves each connected in a first hydraulic circuit with an individual one of the jacks in the plurality and responsive to the closure of individual ones of the switches in the plurality for obtaining an operation of the associated jack to extend the associated jack to the ground with a first particular pressure produced by the ground against the jack, a relief valve, a plurality of bleeder valves each connected in a second circuit with an individual one of the jacks in the plurality and the relief valve for producing an extension to the ground of individual ones of the jacks not extended by the first hydraulic circuit until a second particular pressure is produced by the ground against the jack where the second particular pressure is less than the first particular pressure, and a reservoir for hydraulic fluid, the relief valve being connected in a third hydraulic circuit with the jacks to by-pass the first valves in the plurality and the bleeder valves in the plurality and introduce the fluid to the reservoir when the pressure of the fluid in the jacks reaches the second particular pressure.

18. A combination as set forth in claim 17,
the jacks in the plurality being connected in a third circuit with the bleeder valves in the plurality and the relief valve for introducing hydraulic fluid from the jacks to the reservoir while the vehicle is travelling.

19. A combination as set forth in claim 18,
the bleeder valves in the plurality and the relief valve having opened and closed positions,
the bleeder valve asociated with the individual one of the jacks not previously extended and the relief valve being closed in the first hydraulic circuit,
the relief valve being opened in the second circuit and the bleeder valves in the plurality being closed in the second hydraulic circuit, and
the bleeder valves in the plurality and the relief valve being opened in the third hydraulic circuit.

20. In a combination as set forth in claim 19,
means for discontinuing the extension of the jacks when the pressure in the jacks exceeds a third particular pressure greater than the first and second particular pressures, 21. In a combination as set forth in claim 19,
air bags in the vehicle, the air bags being constructed to be filled with air, and
means for exhausting air from the air bags before the vehicle is levelled.

22. In a combination as recited in claim 21,
each of the bleeder valves in the plurality and the relief valve having opened and closed positions and passing hydraulic fluid in the opened position and
each of the bleeder valves in the plurality being coupled to the relief valve and to the associated jack in the plurality to pass hydraulic fluid from such jack through such bleeder valve and then through the relief valve to obtain an extension of such jack to the second particular pressure when such bleeder valve and the relief valve are opened.

23. In a combination as recited in claim 22,
each bleeder valve being closed when the hydraulic pressure in the associated jack is at least the second particular pressure and the relief valve being opened to interrupt any further extension of the associated jack when the pressure in the associated jack is at least the second particular pressure.

24. In combination for use in a vehicle to level the vehicle relative to gravity,
a plurality of jacks each disposed on the vehicle at a strategic position on the vehicle and each being extensible to adjust the vertical disposition of the vehicle at the strategic position,
means operatively coupled to the jacks in the plurality for operating the jacks in a sequence to level the vehicle,
a plurality of bleeder valves each associated with an individual one of the jacks in the plurality,
a relief valve,
means including the bleeder valve and the relief valve for obtaining an extension until the extertion of a particular pressure by the ground on particular ones of the jacks not previously extended in levelling the vehicle and for thereafter preventing such jacks from being extended, and
the means including the bleeder valves and the relief valve being operative to prevent hydraulic fluid from accumulating in the jacks while the vehicle is travelling.

25. In combination for use in a vehicle to level the vehicle relative to gravity,
a plurality of jacks each disposed on the vehicle at a strategic position on the vehicle and each being extensible to adjust the vertical disposition of the vehicle at the strategic position,
means operatively coupled to the jacks in the plurality for operating the jacks in a sequence to level the vehicle,
a plurality of bleeder valves each associated with an individual one of the jacks in the plurality,
a relief valve, and
means including the bleeder valves and the relief valve for obtaining an extension until the exertion of a particular pressure by the ground on particular ones of the jacks not previously extended in levelling the vehicle and for thereafter preventing such jacks from being extended,
the sequence means being operative to extend the jacks until the imposition by the ground upon the jacks of a second particular pressure greater than the first particular pressure.

26. A combination as set forth in claim 25, the means including the bleeder valves and the relief valve being operative to prevent hydraulic fluid from accumulating in the jacks while the vehicle is travelling, the bleeder valves and the relief valve being opened while the vehicle is travelling.

27. In combination for use in a vehicle to level the vehicle relative to gravity, a plurality of jacks each disposed on the vehicle at a strategic position on the vehicle and each being extensible to adjust the vertical disposition of the vehicle at the strategic position, means operatively coupled to the jacks in the plurality for operating the jacks in a sequence to level the vehicle, a plurality of bleeder valves each associated with an individual one of the jacks in the plurality, a relief valve, and means including the bleeder valves and the relief valve for preventing hydraulic fluid from accumulating in the jacks in the plurality while the vehicle is travelling, and the bleeder valves in the plurality and the relief valve being opened while the vehicle is travelling.

28. A combination as set forth in claim 27, including, the means including the bleeder valves and the relief valve being operative to obtain an extension, until the exertion of a particular pressure by the ground, of particular ones of the jacks not previously extended in levelling the vehicle and for thereafter preventing such jacks from being extended.

29. A combination as set forth in claim 28, including, the bleeder valves for the particular jacks being opened during the extension of the particular jacks to obtain the imposition of the particular pressure and the relief valve being opened after the imposition of the particular pressure on the particular valves.

30. A combination as set forth in claim 27, including, the sequence means being operative to extend the jacks until the imposition by the ground upon the jacks of a particular pressure.

* * * * *